US011883934B2

(12) United States Patent
Massicotte et al.

(10) Patent No.: US 11,883,934 B2
(45) Date of Patent: Jan. 30, 2024

(54) TOOL ASSEMBLY AND METHOD FOR REMOVING A COMPONENT MOUNTED TO A CARRIER

(71) Applicant: Pratt & Whitney Canada Corp., Longueuil (CA)

(72) Inventors: Francois Massicotte, Laval (CA); Alexandre Marsan, Longueuil (CA)

(73) Assignee: Pratt & Whitney Canada Corp., Longueuil (CA)

( * ) Notice: Subject to any disclaimer, the term of this patent is extended or adjusted under 35 U.S.C. 154(b) by 0 days.

(21) Appl. No.: 17/562,454

(22) Filed: Dec. 27, 2021

(65) Prior Publication Data

US 2023/0202009 A1 Jun. 29, 2023

(51) Int. Cl.
*B25B 27/06* (2006.01)

(52) U.S. Cl.
CPC ............ *B25B 27/062* (2013.01); *B25B 27/06* (2013.01); *B25B 27/064* (2013.01)

(58) Field of Classification Search
CPC .... B23P 19/02; B23P 19/027; F16C 2237/00; B25B 27/02; B25B 27/06; B25B 27/062; B25B 27/064
See application file for complete search history.

(56) References Cited

U.S. PATENT DOCUMENTS 36,009 A 7/1862 Lemuth
3,403,434 A 10/1968 Calabro
4,870,740 A 10/1989 Klann
5,894,665 A 4/1999 Olmsted
7,980,604 B2 7/2011 Punaro
10,183,386 B2 1/2019 Peterson
10,265,839 B1 * 4/2019 Hunter .................. B25B 27/026
10,807,222 B2 * 10/2020 Wallman ............... B25B 27/026
2013/0315714 A1 11/2013 Müller
2014/0130352 A1 5/2014 Buldtmann
2018/0142560 A1 5/2018 Wojtowicz
2019/0022804 A1 1/2019 Muldoon

OTHER PUBLICATIONS

EP search report for EP22217274.4 dated May 22, 2023.

* cited by examiner

*Primary Examiner* — Christopher J Besler
(74) *Attorney, Agent, or Firm* — Getz Balich LLC

(57) ABSTRACT

A tool assembly is provided for removing a component from a carrier. The component circumscribes and is mounted on the carrier. The tool assembly includes a tool head, an adaptor and an actuator. The tool head is configured to couple to the component. The adaptor extends longitudinally along a centerline between an adaptor first end and an adaptor second end. The adaptor is attachable to the tool head at the adaptor first end by a first quick coupler. The actuator includes a housing and a ram. The housing is attachable to the adaptor at the adaptor second end by a second quick coupler. The ram extends longitudinally along the centerline within the adaptor and the tool head to a ram distal end. The ram distal end is configured to engage the carrier.

16 Claims, 12 Drawing Sheets

TOOL ASSEMBLY AND METHOD FOR REMOVING A COMPONENT MOUNTED TO A CARRIER

TECHNICAL FIELD

This disclosure relates generally to a gas turbine engine and, more particularly, to removal of a component mounted on a carrier.

BACKGROUND INFORMATION

A gas turbine engine includes one or more rotating assemblies. Each of these rotating assembly may include various components (e.g., bearings, seals, etc.) mounted on a shaft or other carrier. Various methods and tools are known in the art for removing a component mounted on a carrier. While these known methods and tools have various benefits, there is still room in the art for improvement. For example, known removal tools are typically configured for removal of a specific gas turbine engine component and, thus, multiple different removal tools may be needed for servicing and/or inspecting a gas turbine engine. Known removal tools may also be bulky and unwieldy to handle, particularly in tight confines of a gas turbine engine. There is a need in the art therefore for improved methods and tools for removing a component mounted to a carrier.

SUMMARY

According to an aspect of the present disclosure, a tool assembly is provided for removing a component from a carrier. The component circumscribes and is mounted on the carrier. The tool assembly includes a tool head, an adaptor and an actuator. The tool head is configured to couple to the component. The adaptor extends longitudinally along a centerline between an adaptor first end and an adaptor second end. The adaptor is attachable to the tool head at the adaptor first end by a first quick coupler. The actuator includes a housing and a ram. The housing is attachable to the adaptor at the adaptor second end by a second quick coupler. The ram extends longitudinally along the centerline within the adaptor and the tool head to a ram distal end. The ram distal end is configured to engage the carrier.

According to another aspect of the present disclosure, another tool is provided for removing a first component from a first carrier and a second component from a second carrier. The first component circumscribes and is mounted on the first carrier. The second component circumscribes and is mounted on the second carrier. The second component has a different configuration than the first component. The tool assembly includes a first tool head, a second tool head, an adaptor and a linear actuator. The first tool head is configured to mate with and grip the first component. The second tool head is configured to mate with and grip the second component. The adaptor extends longitudinally along a centerline between an adaptor first end and an adaptor second end. The adaptor includes a first coupler configured to: attach the first tool head to the adaptor at the adaptor first end where the first component is being removed from the first carrier; and attach the second tool head to the adaptor at the adaptor first end where the second component is being removed from the second carrier. The linear actuator includes a housing and a ram. The housing is attachable to the adaptor at the adaptor second end by a second coupler. The ram extends longitudinally along the centerline to a ram distal end. The ram is configured to engage the first carrier or the second carrier at the ram distal end.

According to still another aspect of the present disclosure, a method is provided for removing a component from a carrier. The component circumscribes and is mounted on the carrier. During this method, a tool assembly is provided that includes a plurality of tool heads, an adaptor and an actuator. Each of the tool heads has a different configuration. The adaptor extends longitudinally along a centerline between an adaptor first end and an adaptor second end. The adaptor is separately attachable to each of the tool heads at the adaptor first end through a first coupler. The actuator includes a housing and a ram. The housing is attached to the adaptor at the adaptor second end by a second coupler. The ram extends longitudinally along the centerline to a ram distal end. A first of the tool heads is selected based on a configuration of the component. The first of the tool heads is coupled to the component. The first of the tool heads is attached to the adaptor using the first coupler. The ram pushes longitudinally against the carrier to slide the component off of the carrier.

The component and the carrier may be configured for a gas turbine engine.

The first component and the first carrier may be configured for a gas turbine engine. The second component and the second carrier may also be configured for the gas turbine engine.

At least one of the tool heads may be configured for coupling to a gas turbine engine bearing component mounted on the carrier.

At least one of the tool heads may be configured for coupling to a gas turbine engine seal element mounted on the carrier.

The first of the tool heads may be attached to the adaptor without use of a tool.

The first coupler may be configured as or otherwise include a first quick coupler. In addition or alternatively, the second coupler may be configured as or otherwise include a second quick coupler.

The adaptor may include the first quick coupler. The housing may include the second quick coupler.

The first quick coupler may be configured for attachment of the adaptor to the tool head without use of a tool. In addition or alternatively, the first quick coupler may be configured for removal of the adaptor from the tool head without use of a tool.

The first quick coupler may include a latch. The latch may be pivotable between a locked position and an unlocked position. The latch may be configured to engage a notch when in the locked position to lock the adaptor onto the tool head.

The tool head may include a mount. The first quick coupler may include a receptacle configured to receive the mount. The mount may be configured to twist about the centerline within the receptacle between an unlocked position and a locked position. The tool head may be secured to the adaptor when in the locked position.

The first quick coupler may include a receptacle and a keyed interior rim with a keyed orifice to the receptacle. The tool head may include a mount with a keyed exterior rim. The keyed exterior rim may be configured to pass through the keyed orifice into the receptacle. The mount and the receptacle may be configured to twist relative to one another between an unlocked position and a locked position. The keyed interior rim may capture the keyed exterior rim within the receptacle when in the locked position.

The second quick coupler may be configured for attachment of the housing to the adaptor without use of a tool. In addition or alternatively, the second quick coupler may be configured for removal of the housing from the adaptor without use of a tool.

The second quick coupler may include a latch. The latch may be pivotable between a locked position and an unlocked position. The latch may be configured to engage a notch when in the locked position to lock the housing onto the adaptor.

The adaptor may include a mount. The second quick coupler may include a receptacle configured to receive the mount. The mount may be configured to twist about the centerline within the receptacle between an unlocked position and a locked position. The adaptor may be secured to the housing when in the locked position.

The second quick coupler may include a receptacle and a keyed interior rim with a keyed orifice to the receptacle. The adaptor may include a mount with a keyed exterior rim. The keyed exterior rim may be configured to pass through the keyed orifice into the receptacle. The mount and the receptacle may be configured to twist relative to one another between an unlocked position and a locked position. The keyed interior rim may capture the keyed exterior rim within the receptacle when in the locked position.

The adaptor may include the first quick coupler, a tubular sidewall and a mount. The tubular sidewall may extend circumferentially about the centerline. The tubular sidewall may extend longitudinally along the centerline between the first quick coupler and the mount. The mount may be mated with the second quick coupler to attach the housing to the adaptor.

The tool head may include a plurality of grips and a sleeve. The grips may be arrangeable about and may be configured to engage the component. A first of the grips may include a protrusion configured to project radially into an aperture in the component. The sleeve may be slidable over the grips to retain the grips in engagement with the component.

The actuator may be configured as or otherwise include a linear actuator.

The actuator may be configured as or otherwise include a hydraulic jack with a piston configured to move the ram longitudinally along the centerline.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
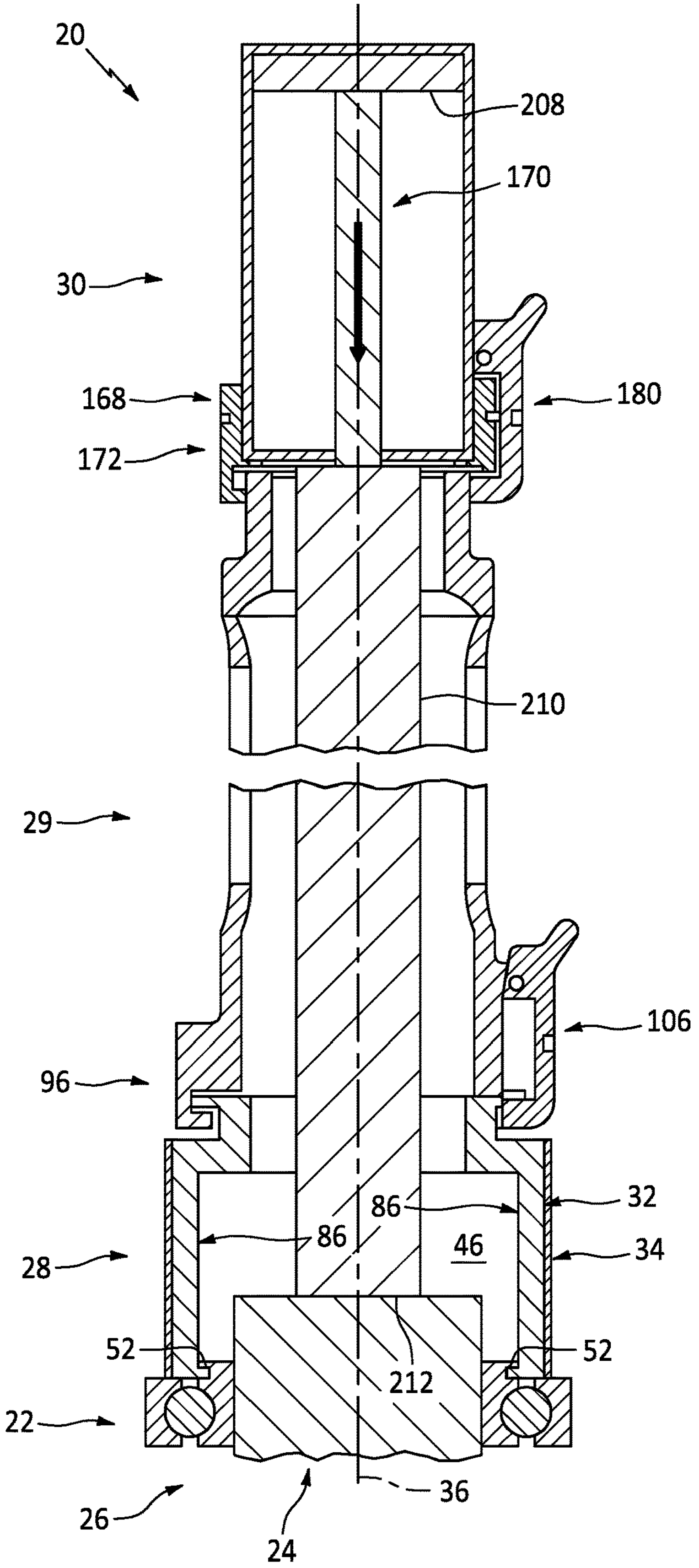
FIG. 1 is a side sectional illustration of a tool assembly for removing a component mounted on a carrier.

FIG. 1 illustrates a tool assembly 20 for removing a mounted component 22 from a component carrier 24. The component 22 may be a bearing, a component (e.g., an inner race) of the bearing, a seal element or any other component of a rotating assembly 26 for a gas turbine engine which circumscribes and is mounted on the carrier 24. The carrier 24 may be a shaft for the rotating assembly 26, or another component mounted on and/or otherwise rotatable with the shaft or still another component of the rotating assembly 26. The tool assembly 20 of the present disclosure, however, is not limited to the foregoing exemplary mounted component and carrier configurations. The tool assembly 20 of FIG. 1 includes a tool head 28, a tool adaptor 29 and a tool actuator 30.

The tool head 28 is configured to grip, hold and/or removably attach to the component 22. The tool head 28 of FIG. 2, for example, includes a grip head 32 and a head sleeve 34.

Figure 3:
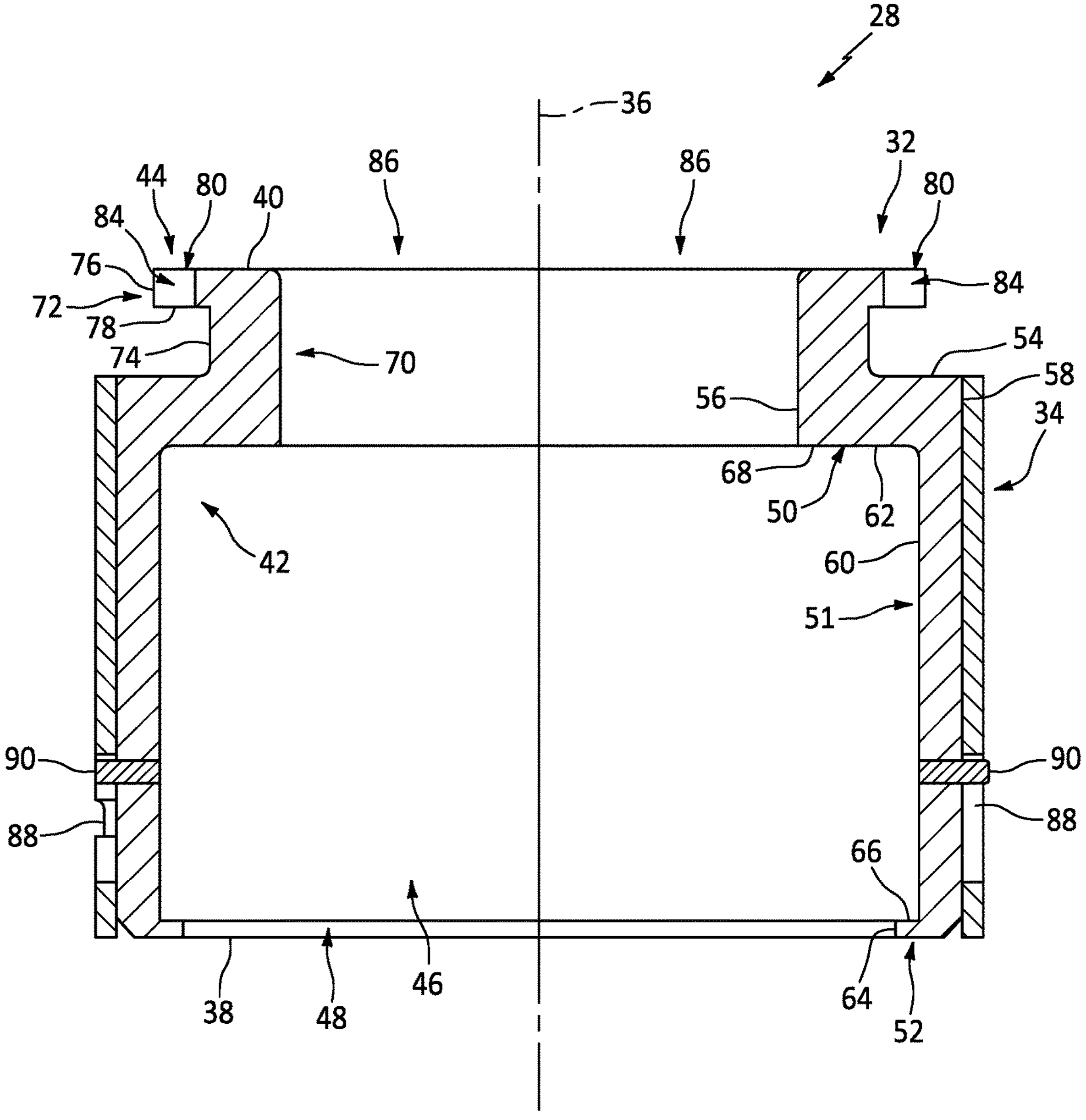
FIG. 3 is a side sectional illustration of the head.

Referring to FIG. 3, the grip head 32 extends longitudinally along a longitudinal centerline 36 of the tool assembly 20 and/or one or more of its members 28-30 (see FIG. 1) between and to a first end 38 of the tool head 28 and its grip head 32 and a second end 40 of the tool head 28 and its grip head 32. The grip head 32 extends circumferentially about (e.g., completely around) the centerline 36, which may provide the grip head 32 with a full-hoop tubular body. The grip head 32 of FIG. 3 includes a head base 42 and a head mount 44.

The head base 42 provides the tool head 28 with a tool head receptacle 46 and a tool head orifice 48. The head base 42 of FIG. 3, for example, includes an annular tool head endwall 50, a tubular tool head sidewall 51 and an interior (e.g., inward facing) tool head rim 52; e.g., an annular protrusion.

The head endwall 50 is arranged at a second end 54 of the head base 42, for example, proximate (but, longitudinally recessed from) the head second end 40. The head endwall 50 extends circumferentially about (e.g., completely around) the centerline 36. The head endwall 50 extends radially between and to an inner side 56 of the grip head 32 and an outer side 58 of the grip head 32.

The head sidewall 51 is connected to (e.g., formed integral with) the head endwall 50 at (e.g., on, adjacent or proximate) the grip head outer side 58. The head sidewall 51 projects longitudinally out from the head endwall 50 to the head first end 38. The head sidewall 51 extends circumferentially about (e.g., completely around) the centerline 36. The head sidewall 51 extends radially between and to an inner side 60 of the head sidewall 51 and the grip head outer side 58, where the sidewall inner side 60 is recessed radially outward from the grip head inner side 56. An annular shelf

62 extends radially between and to the grip head inner side 56 and the sidewall inner side 60.

The head rim 52 is connected to (e.g., formed integral with) the head sidewall 51 at the head first end 38. The head rim 52 projects radially inward from the head sidewall 51 to a distal end 64 of the head rim 52. The head rim 52 extends longitudinally between and to the head first end 38 and a second end 66 of the head rim 52. The head rim 52 extends circumferentially about (e.g., completely around) the centerline 36.

With the foregoing arrangement, the head receptacle 46 is formed as an internal cavity within the grip head 32 by the tool head members 50-52. The head receptacle 46 of FIG. 3, for example, extends longitudinally within the tool head 28 between and to the head rim second end 66 (e.g., the shelf 62) and a first end 68 of the head endwall 50. The head receptacle 46 extends radially within the tool head 28 to the sidewall inner side 60. The head orifice 48 is formed by the head rim 52 at its distal end 64. The head orifice 48 provides a port (e.g., an opening) to the head receptacle 46.

The head mount 44 of FIG. 3 includes a head mount base 70 and an exterior (e.g., outward facing) keyed tool head rim 72 ("keyed head rim"). The head mount base 70 is connected to (e.g., formed integral with) the head base 42 and its head endwall 50. The head mount base 70 extends projects longitudinally along the centerline 36 out from the head endwall 50 to the head second end 40. The head mount base 70 extends circumferentially about (e.g., completely around) the centerline 36. The head mount base 70 extends radially between and to the grip head inner side 56 and an outer side 74 of the head mount base 70.

Figure 2:
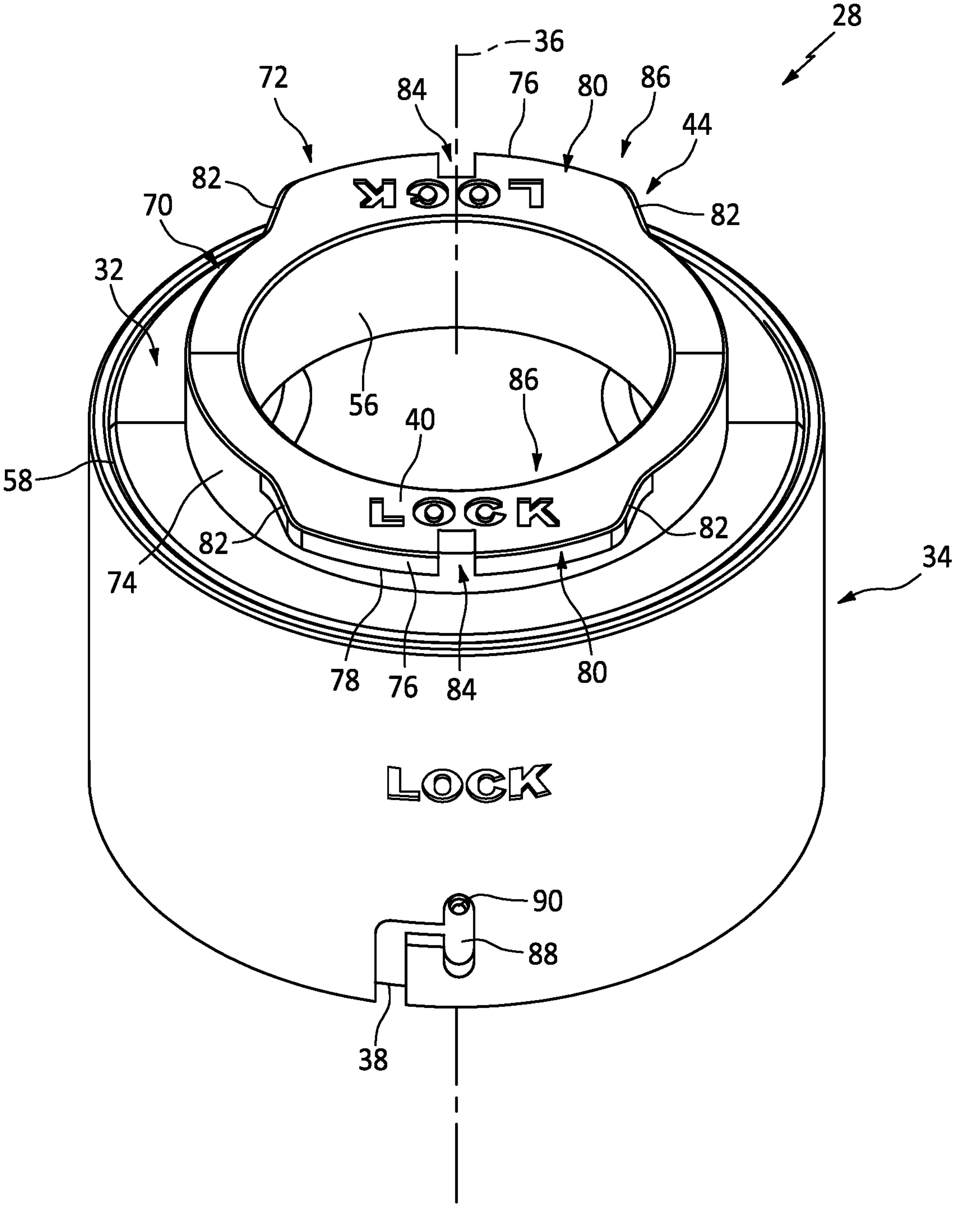
FIG. 2 is a perspective illustration of a head for the tool assembly.

The keyed head rim 72 is connected to (e.g., formed integral with) the head mount base 70 at the head second end 40. The keyed head rim 72 projects radially out (in a radial outward direction) from the head mount base 70 to a distal end 76 of the keyed head rim 72. The keyed head rim 72 extends longitudinally between and to a first end 78 of the keyed head rim 72 and the head second end 40. Referring to FIG. 2, the keyed head rim 72 includes one or more tool head protrusions 80 (e.g., tabs, lugs, etc.) distributed circumferentially about the centerline 36 in an array. Each of these head protrusions 80 extends circumferentially about the centerline 36 between circumferentially opposing ends 82, where each circumferential end 82 is circumferentially spaced from a respective circumferential end 82 of a neighboring head protrusion 80. One or more of the head protrusions 80 may be configured with a notch 84. This notch 84 may extend longitudinally through the respective head protrusion 80. The notch 84 may extend circumferentially within the respective head protrusion 80. The notch 84 may extend partially radially into the respective head protrusion 80 from the respective distal end 76.

The grip head 32 of FIGS. 2 and 3 is formed by an arrangement of a plurality discrete and separable grips 86; e.g., a pair of clamp halves. Each of the grips 86 in FIGS. 2 and 3 includes a respective section (e.g., half) of each of the grip head members 42 and 44. With such an arrangement, referring to FIG. 1, the grips 86 may be separated from one another to facilitate mating the grip head 32 with the component 22. More particularly, a portion of the component 22 may extend through the head orifice 48 and into the head receptacle 46 (see FIG. 3), where the head rim 52 projects radially into an aperture (e.g., a groove, a channel, a pocket, etc.) in the component 22. The grip head 32 may thereby be removably attached to the component 22.

To lock the grip head 32 onto the component 22, the head sleeve 34 is mated with the grip head 32. More particularly, the head sleeve 34 is translated longitudinally along the centerline 36 to slide over the grips 86. The head sleeve 34 may thereby form a hoop retainer about the grips 86 which prevents (or limits) radial movement of the grips 86; e.g., separation of the grips 86 from the component 22. Referring to FIG. 2, the head sleeve 34 may also include one or more slots 88 (see also FIG. 3), where each of these slots 88 receives a pin 90 projecting out from the grip head 32 and a respective one of its grips 86. This pin-slot connection may lock the head sleeve 34 onto the grip head 32 for the removal of the component 22 from the carrier 24; see FIG. 1.

The tool adaptor 29 of FIG. 1 is configured as an extension for the tool head 28 and an adaptor for the tool actuator 30. The tool adaptor 29 of FIG. 4, for example, extends longitudinally along the centerline 36 between and to a first end 92 of the tool adaptor 29 and a second end 94 of the tool adaptor 29. The tool adaptor 29 extends circumferentially about (e.g., completely around) the centerline 36, which may provide the tool adaptor 29 with a full-hoop tubular body. The tool adaptor 29 includes a tool adaptor coupler 96, a tool adaptor mount 97 and a tool adaptor extension 98.

Figure 5:
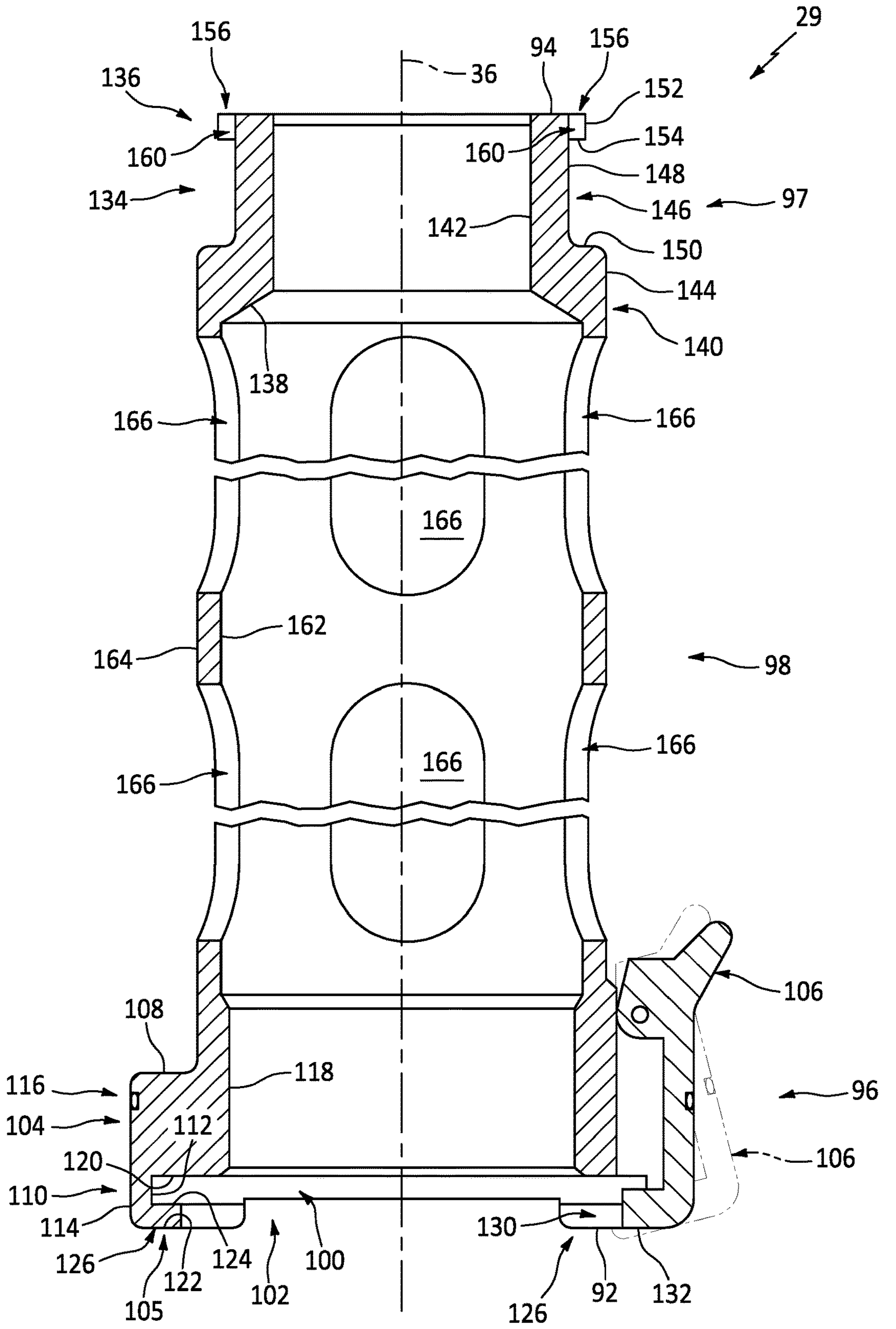
FIG. 5 is a partial sectional illustration of the adaptor.

Referring to FIG. 5, the adaptor coupler 96 provides the tool adaptor 29 with a tool adaptor receptacle 100 and a keyed tool adaptor orifice 102 ("keyed adaptor orifice"). The adaptor coupler 96 of FIG. 5, for example, includes an adaptor coupler base 104 and an interior keyed adaptor coupler rim 105 ("keyed adaptor rim"). The adaptor coupler 96 of FIG. 5 also includes an adaptor coupler latch 106 ("adaptor latch").

The adaptor coupler base 104 extends longitudinally along the centerline 36 between and to the adaptor first end 92 and a second end 108 of the adaptor coupler base 104. The adaptor coupler base 104 extends circumferentially about (e.g., completely around) the centerline 36. A (e.g., annular) first section 110 of the adaptor coupler base 104 arranged at the adaptor first end 92 extends radially between and to an inner side 112 of the base first section 110 and an outer side 114 of the adaptor coupler base 104. A (e.g., annular) second section 116 of the adaptor coupler base 104 at the base second end 108 extends radially between an inner side 118 of the base second section 116 and the base outer side 114, where the first section inner side 112 is recessed radially outward from the second section inner side 118. An annular shelf 120 extends radially between and to the first section inner side 112 and the second section inner side 118.

Figure 6:
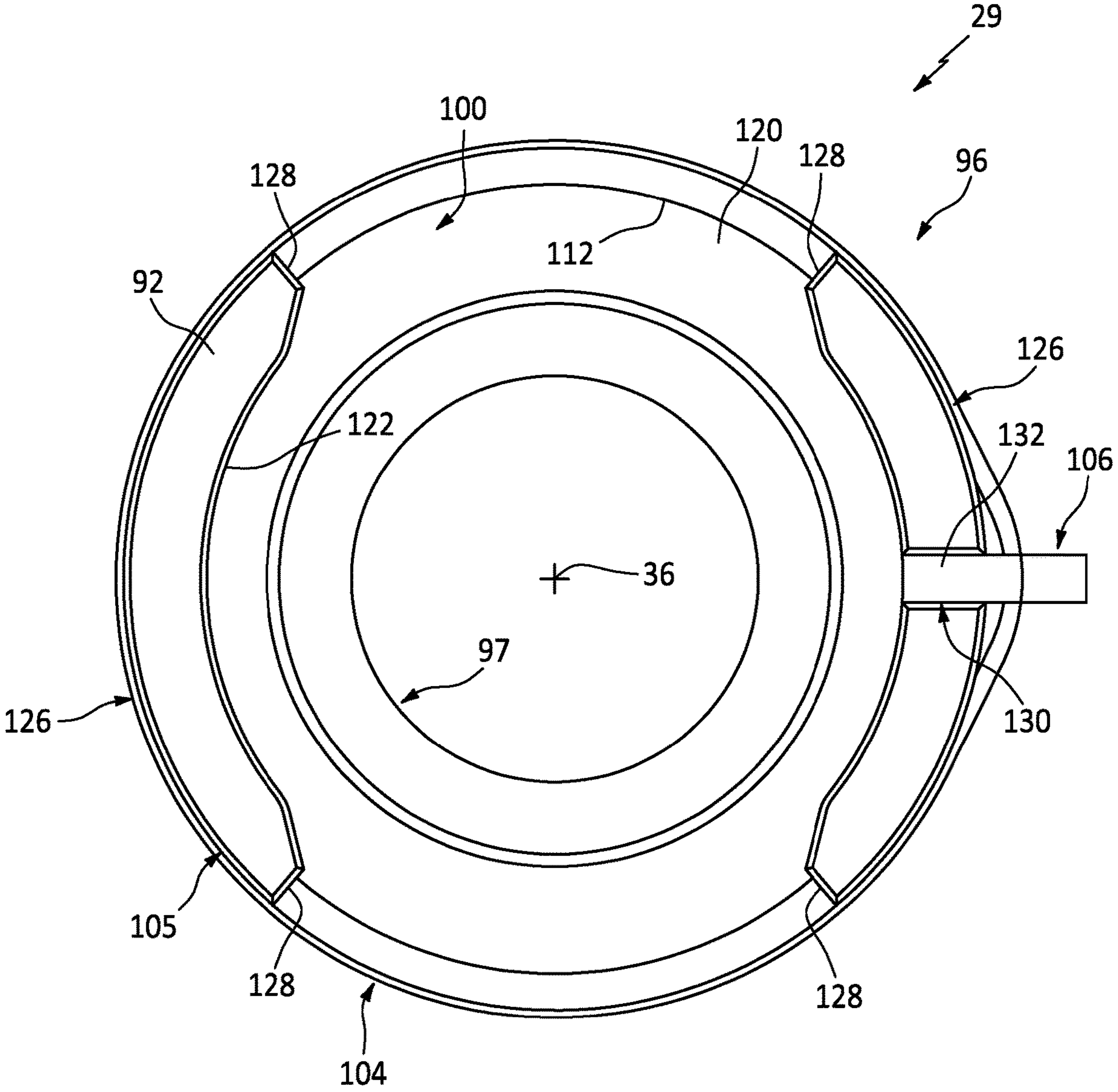
FIG. 6 is an end view illustration of the adaptor.

The keyed adaptor rim 105 is connected to (e.g., formed integral with) the adaptor coupler base 104 at the adaptor first end 92. The keyed adaptor rim 105 projects radially out (in a radial inward direction) from the adaptor coupler base 104 to a distal end 122 of the keyed adaptor rim 105. The keyed adaptor rim 105 extends longitudinally between and to the adaptor first end 92 and a second end 124 of the keyed adaptor rim 105, which is longitudinally adjacent the first section inner side 112. Referring to FIG. 6, the keyed adaptor rim 105 includes one or more adaptor coupler protrusions 126 (e.g., tabs, lugs, etc.) distributed circumferentially about the centerline 36 in an array. Each of these adaptor coupler protrusions 126 extends circumferentially about the centerline 36 between circumferentially opposing ends 128, where each circumferential end 128 is circumferentially spaced from a respective circumferential end 128 of a neighboring adaptor coupler protrusion 126. At least one of the adaptor protrusions 126 may be configured with a notch 130. This notch 130 may extend longitudinally through the respective adaptor coupler protrusion 126. The notch 130 may extend circumferentially within the respective adaptor coupler protrusion 126. The notch 130 may extend partially radially into the respective adaptor coupler protrusion 126 from its distal end 122.

With the foregoing arrangement, the adaptor receptacle 100 of FIG. 5 is formed as an internal groove within the adaptor coupler 96 by the adaptor coupler members 104 and 105. The adaptor receptacle 100 of FIG. 5, for example, extends longitudinally within the tool adaptor 29 between and to the annular shelf 120 and the adaptor rim second end 124. The adaptor receptacle 100 extends radially within the tool adaptor 29 to the first section inner side 112. The keyed adaptor orifice 102 is formed by the keyed adaptor rim 105 and the first section 110 of the adaptor coupler base 104 at the distal ends 122; see also FIG. 6.

Figure 4:
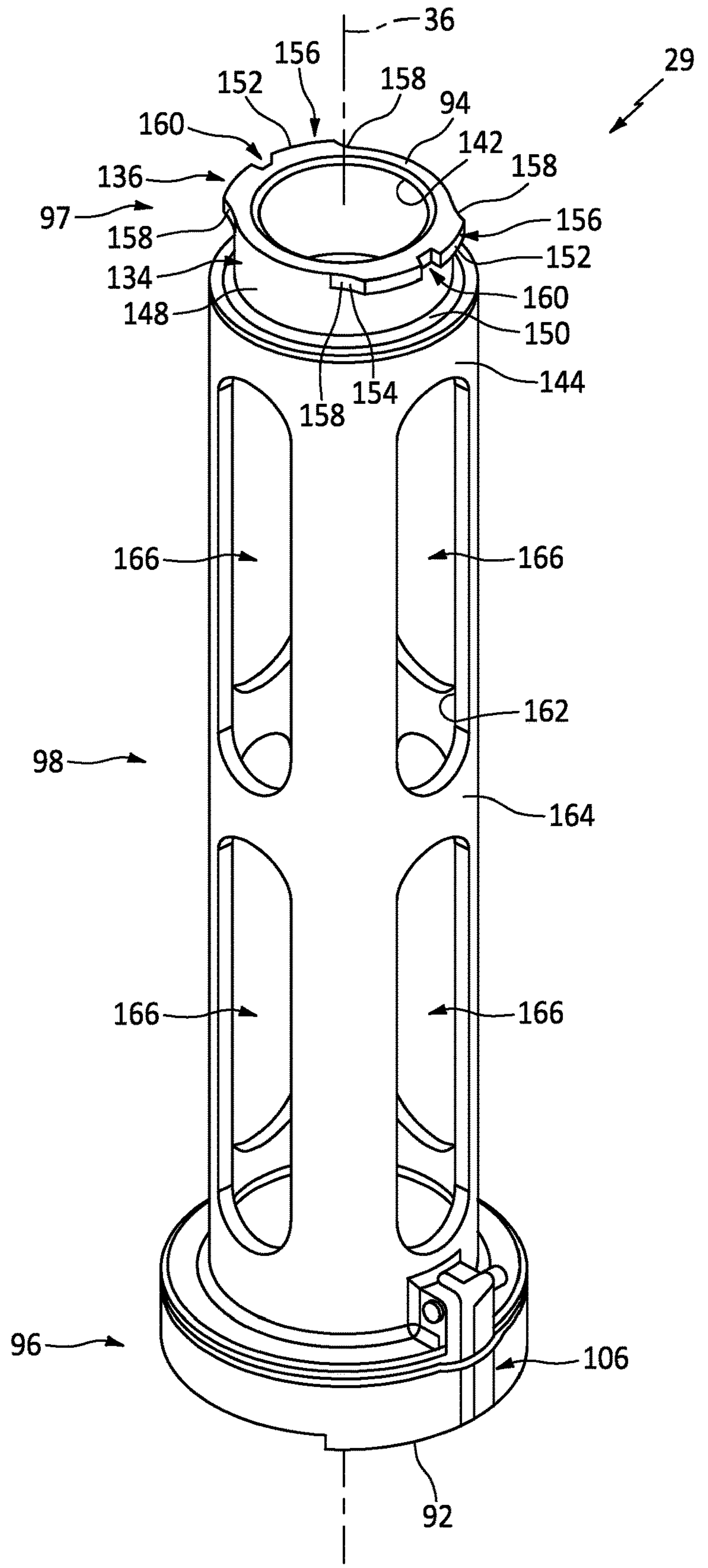
FIG. 4 is a perspective illustration of an adaptor for the tool assembly.

The adaptor latch 106 of FIG. 4 is pivotally connected to the tool adaptor 29 and, for example, its adaptor extension 98 by a pivot connection (e.g., a pin connection) to one or more mounts; e.g., tabs. Referring to FIG. 5, this adaptor latch 106 is configured to pivot about a pivot axis of the pivot connection, where the adaptor latch 106 may move between a locked position (solid line adaptor latch 106 in FIG. 5) and an unlocked position (dashed line adaptor latch 106 in FIG. 5). In its locked position, an end 132 of the adaptor latch 106 is mated with (e.g., received within, projects into) the notch 130.

Figure 7A:
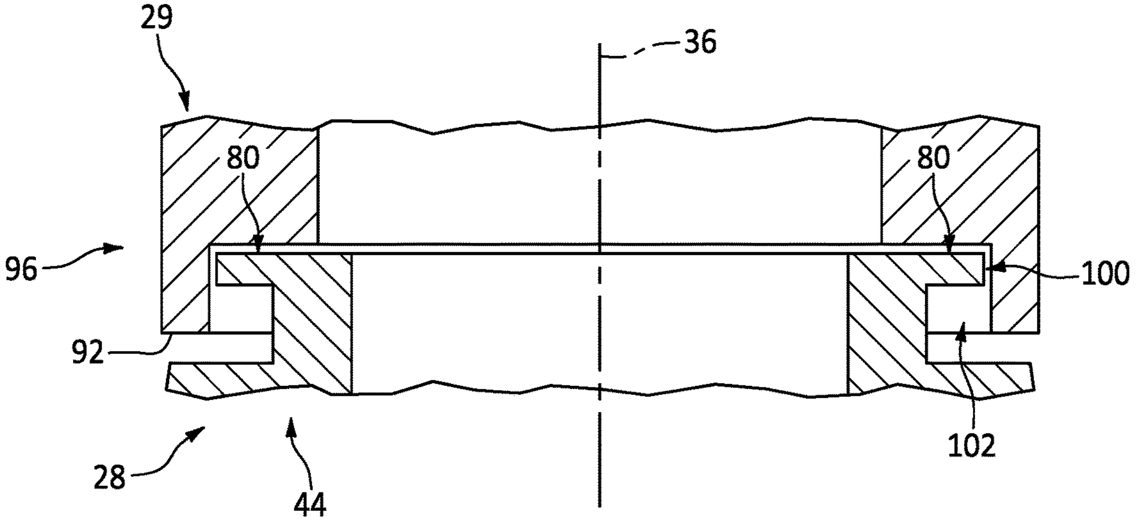
FIG. 7A is side sectional illustration of an interface between the adaptor and the head at an unlocked position.
Figure 7B:
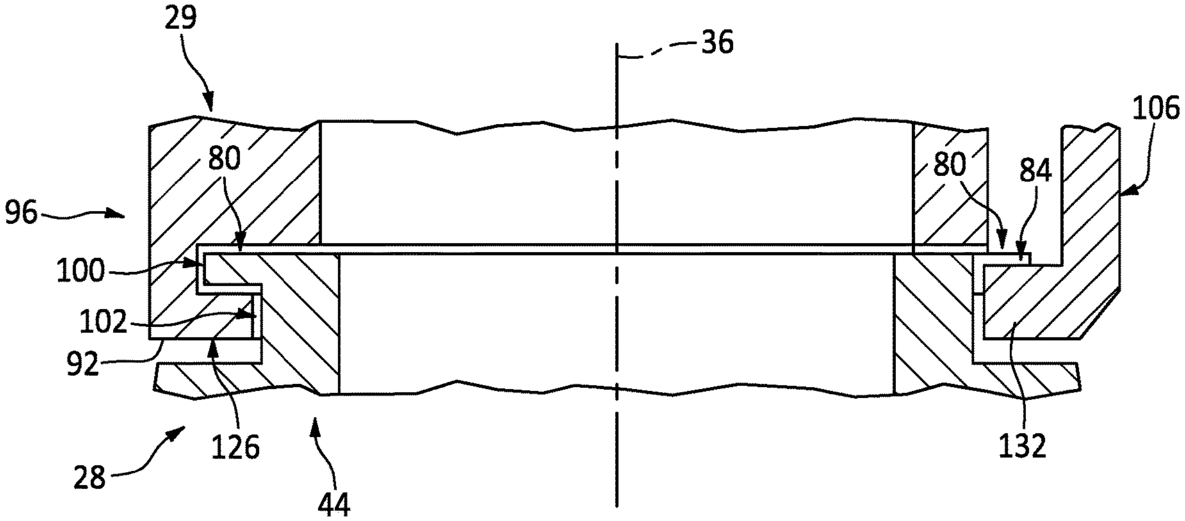
FIG. 7B is a side sectional illustration of the interface between the adaptor and the head at a locked position.

FIGS. 7A and 7B illustrate a sequence of mating the adaptor coupler 96 with the head mount 44 to attach the tool adaptor 29 to the tool head 28 at the adaptor first end 92. During this mating, referring to FIG. 7A, the adaptor coupler 96 (or the tool head 28) may be clocked about the centerline 36 such that the head protrusions 80 (see also FIG. 2) circumferentially align with gaps between the adaptor coupler protrusions 126 (see also FIG. 6). The head mount 44 and its head protrusions 80 may thereby pass longitudinally through the keyed adaptor orifice 102 into the adaptor receptacle 100. Referring to FIG. 7B, the adaptor coupler 96 (or the tool head 28) may then be clocked about the centerline 36 from an unlocked position (see FIG. 7A) to a locked position (see FIG. 7B) such that the head protrusions 80 (see also FIG. 2) circumferentially align with (e.g., circumferentially overlap) the adaptor coupler protrusions 126 (see also FIG. 6). In this locked position of FIG. 7B, the adaptor coupler protrusions 126 longitudinally capture and hold the head protrusions 80 in the adaptor receptacle 100. In addition, the end 132 of the adaptor latch 106 may also mate with the notch 84 to rotationally lock the adaptor coupler 96 to the head mount 44.

The adaptor mount 97 of FIG. 4 includes an adaptor mount base 134 and an exterior adaptor mount keyed rim 136 ("keyed mount rim"). The adaptor mount base 134 of FIG. 5 extends longitudinally along the centerline 36 between and to a first end 138 of the adaptor mount base 134 and the adaptor second end 94. The adaptor mount base 134 extends circumferentially about (e.g., completely around) the centerline 36. A (e.g., annular) first section 140 of the adaptor mount base 134 arranged at the base first end 138 extends radially between and to an inner side 142 of the adaptor mount base 134 and an outer side 144 of the adaptor mount base first section 140. A (e.g., annular) second section 146 of the adaptor mount base 134 at the adaptor second end 94 extends radially between the adaptor mount base inner side 142 and an outer side 148 of the adaptor mount base 134, where the second section outer side 148 is recessed radially inward from the first section outer side 144. An annular shelf 150 extends radially between and to the first section outer side 144 and the second section outer side 148.

The keyed mount rim 136 is connected to (e.g., formed integral with) the adaptor mount base 134 at the adaptor second end 94. The keyed mount rim 136 projects radially out (in the radial outward direction) from the adaptor mount base 134 to a distal end 152 of the keyed mount rim 136. The keyed mount rim 136 extends longitudinally between and to a first end 154 of the keyed mount rim 136 and the adaptor second end 94. Referring to FIG. 4, the keyed mount rim 136 includes one or more adaptor mount protrusions 156 (e.g., tabs, lugs, etc.) distributed circumferentially about the centerline 36 in an array. Each of these adaptor mount protrusions 156 extends circumferentially about the centerline 36 between circumferentially opposing ends 158, where each circumferential end 158 if circumferentially spaced from a respective circumferential end 158 of a neighboring adaptor mount protrusion 156. One or more of the adaptor mount protrusions 156 may be configured with a notch 160. This notch 160 may extend longitudinally through the respective adaptor mount protrusion 156. The notch 160 may extend circumferentially within the respective adaptor mount protrusion 156. The notch 160 may extend partially radially into the respective adaptor mount protrusion 156 from the respective distal end 152.

The adaptor extension 98 of FIG. 5 is connected to (e.g., formed integral with) the adaptor coupler 96 and its adaptor coupler base 104 and the adaptor mount 97 and its adaptor mount base 134. The adaptor extension 98 extends longitudinally along the centerline 36 between and to the adaptor coupler base 104 and the adaptor mount base 134. The adaptor extension 98 extends circumferentially about (e.g., completely around) the centerline 36. The adaptor extension 98 extends radially between and to an inner side 162 of the adaptor extension 98 and an outer side 164 of the adaptor extension 98, which outer side 164 may also be the first section outer side 144. The adaptor extension 98 may include one or more apertures 166 (e.g., through-holes, windows, etc.) arranged circumferentially about and/or longitudinally along the centerline 36. Each of these apertures 166 may extend radially through a tubular sidewall of the adaptor extension 98 between the extension inner side 162 and the extension outer side 164. With this configuration, the adaptor extension 98 may provide a tubular truss and/or web for structurally connecting the adaptor coupler 96 to the adaptor mount 97.

Referring to FIG. 1, the tool actuator 30 may be configured as a linear actuator such as, but not limited to, a hydraulic jack. The tool actuator 30 of FIG. 1, for example, includes a tool actuator housing 168 and a tool actuator driver 170. The actuator housing 168 includes an actuator coupler 172.

Figure 8:
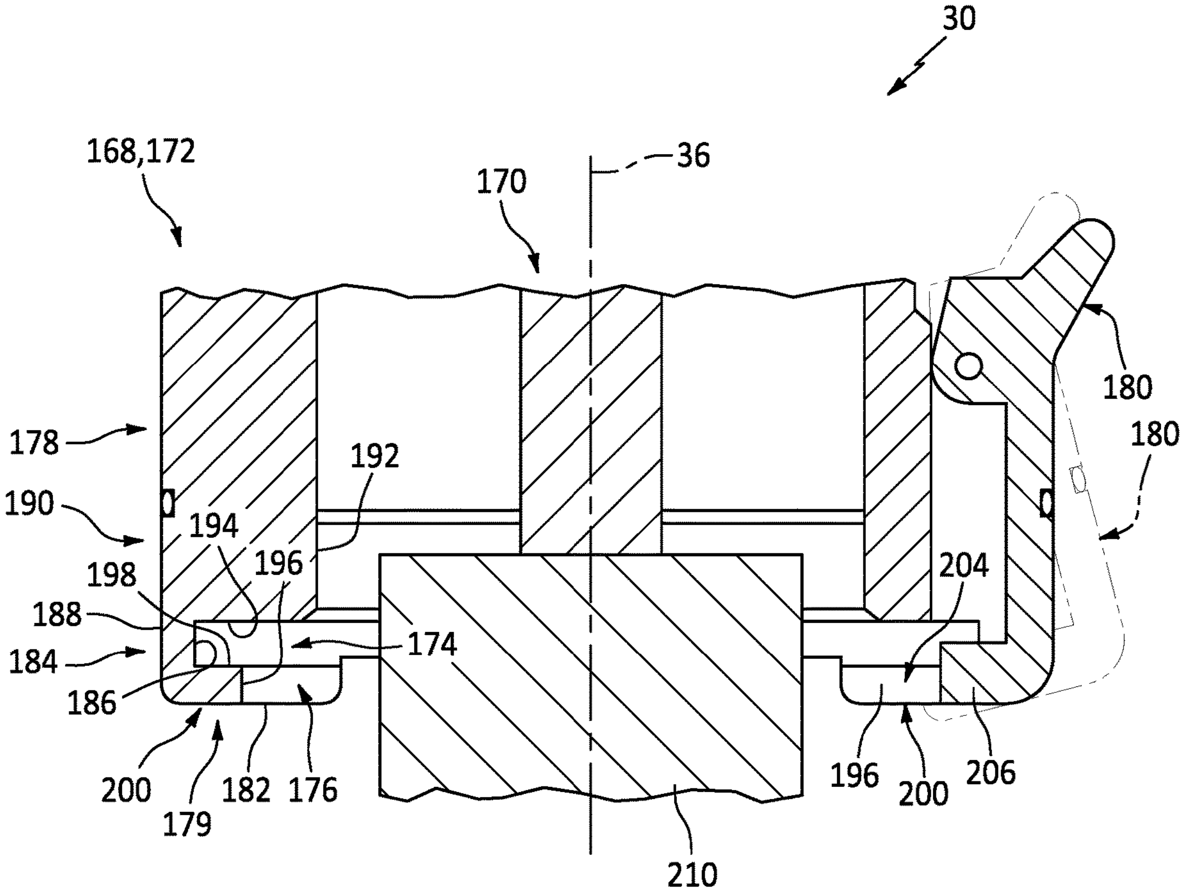
FIG. 8 is a side sectional illustration of a portion of an actuator for the tool assembly at a coupler for the actuator.

Referring to FIG. 8, the actuator coupler 172 provides the actuator housing 168 with a tool actuator receptacle 174 and a keyed tool actuator orifice 176 ("keyed actuator orifice"). The actuator coupler 172 of FIG. 8, for example, includes an actuator coupler base 178 and an interior keyed actuator coupler rim 179 ("keyed actuator rim"). The actuator coupler 172 of FIG. 8 also includes an actuator coupler latch 180 ("actuator latch").

The actuator coupler base 178 extends longitudinally along the centerline 36 between and to a first end 182 of the actuator housing 168. The actuator coupler base 178 extends circumferentially about (e.g., completely around) the centerline 36. A (e.g., annular) first section 184 of the actuator coupler base 178 arranged at the actuator first end 182 extends radially between and to an inner side 186 of the base first section 184 and an outer side 188 of the actuator coupler base 178. A (e.g., annular) second section 190 of the actuator coupler base 178 extends radially between an inner side 192 of the base second section 190 and the base outer side 188, where the first section inner side 186 is recessed radially outward from the second section inner side 192. An annular shelf 194 extends radially between and to the first section inner side 186 and the second section inner side 192.

Figure 9:
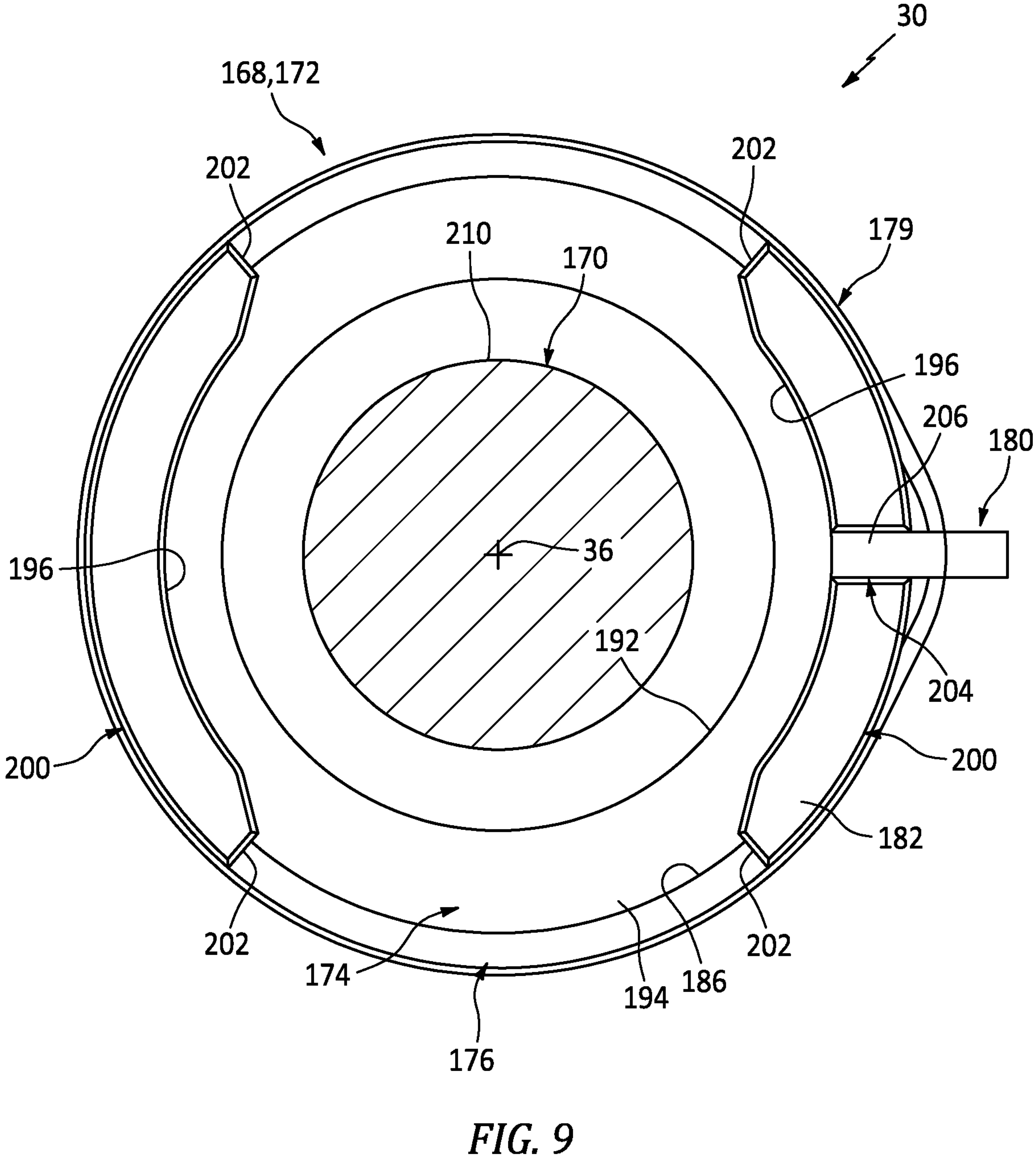
FIG. 9 is a cross-sectional illustration of the actuator.

The keyed actuator rim 179 is connected to (e.g., formed integral with) the actuator coupler base 178 at the actuator first end 182. The keyed actuator rim 179 projects radially out (in the radial inward direction) from the actuator coupler base 178 to a distal end 196 of the keyed actuator rim 179. The keyed actuator rim 179 extends longitudinally between and to the actuator first end 182 and a second end 198 of the keyed actuator rim 179, which is longitudinally adjacent the first section inner side 186. Referring to FIG. 9, the keyed actuator rim 179 includes one or more actuator coupler protrusions 200 (e.g., tabs, lugs, etc.) distributed circumferentially about the centerline 36 in an array. Each of these actuator coupler protrusions 200 extends circumferentially about the centerline 36 between circumferentially opposing ends 202, where each circumferential end 202 is circumferentially spaced from a respective circumferential end 202 of a neighboring actuator coupler protrusion 200. At least one of the actuator coupler protrusions 200 may be configured with a notch 204. This notch 204 may extend longitudinally through the respective actuator coupler protrusion 200. The notch 204 may extend circumferentially within the respective actuator coupler protrusion 200. The notch 204 may extend partially radially into the respective actuator coupler protrusion 200 from its distal end 196 (see FIG. 8).

With the foregoing arrangement, the actuator receptacle 174 of FIG. 8 is formed as an internal groove within the actuator coupler 172 by the actuator coupler members 178 and 179. The actuator receptacle 174 of FIG. 8, for example, extends longitudinally within the actuator housing 168 between and to the annular shelf 194 and the actuator rim second end 198. The actuator receptacle 174 extends radially within the actuator housing 168 to the first section inner side 186. The keyed actuator orifice 176 is formed by the keyed actuator rim 179 and the first section 184 of the actuator coupler base 178 at the distal ends 196; see also FIG. 9.

The actuator latch 180 of FIG. 8 is pivotally connected to the actuator housing 168 by a pivot connection (e.g., a pin connection) to one or more mounts; e.g., tabs. This actuator latch 180 is configured to pivot about a pivot axis of the pivot connection, where the actuator latch 180 may move between a locked position (solid line actuator latch 180 in FIG. 8) and an unlocked position (dashed line actuator latch 180 in FIG. 8). In its locked position, an end 206 of the actuator latch 180 is mated with (e.g., received within, projects into) the notch 204.

Figure 10A:
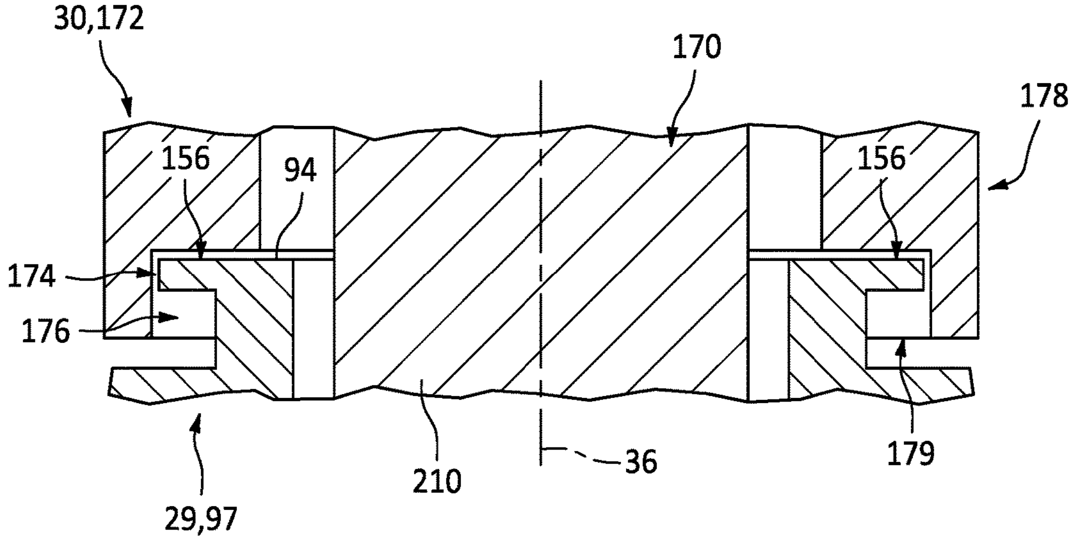
FIG. 10A is side sectional illustration of an interface between the adaptor and the actuator at an unlocked position.
Figure 10B:
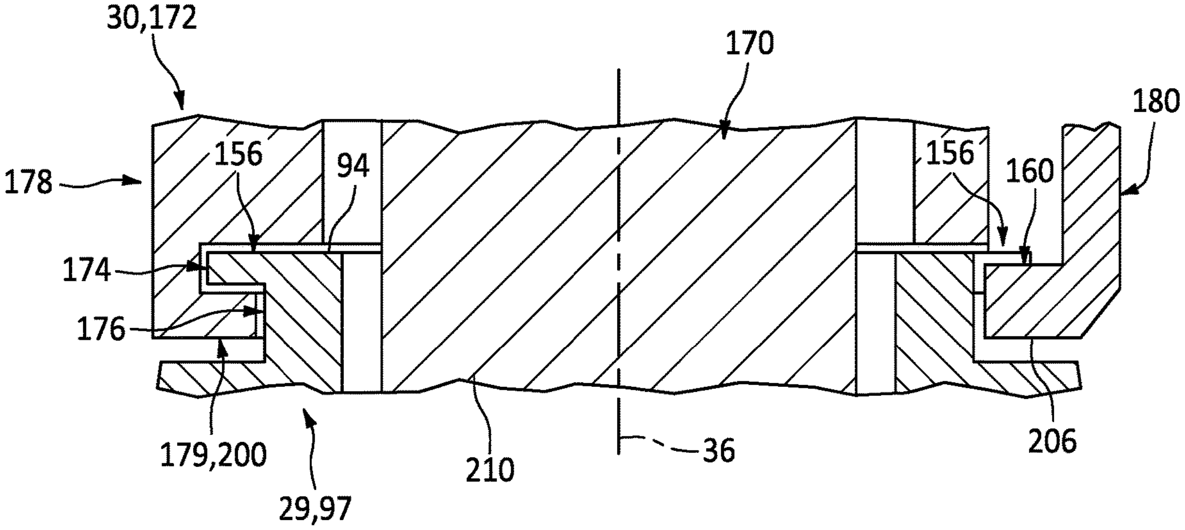
FIG. 10B is a side sectional illustration of the interface between the adaptor and the actuator at a locked position.

FIGS. 10A and 10B illustrate a sequence of mating the actuator coupler 172 with the adaptor mount 97 to attach the tool actuator 30 to the tool adaptor 29 at the adaptor second end 94. During this mating, referring to FIG. 10A, the actuator coupler 172 (or the tool adaptor 29) may be clocked about the centerline 36 such that the adaptor mount protrusions 156 (see FIG. 4) circumferentially align with gaps between the actuator coupler protrusions 200 (see FIG. 9). The adaptor mount 97 and its adaptor mount protrusions 156 may thereby pass longitudinally through the keyed actuator orifice 176 into the actuator receptacle 174. Referring to FIG. 10B, the actuator coupler 172 (or the tool adaptor 29) may then be clocked about the centerline 36 from an unlocked position (see FIG. 10A) to a locked position (see FIG. 10B) such that the adaptor mount protrusions 156 (see also FIG. 4) circumferentially align with (e.g., circumferentially overlap) the actuator coupler protrusions 200 (see also FIG. 9). In this locked position of FIG. 10B, the actuator coupler protrusions 200 longitudinally capture and hold the adaptor mount protrusions 156 in the actuator receptacle 174. In addition, the end 206 of the actuator latch 180 may also mate with the notch 160 to rotationally lock the actuator coupler 172 to the adaptor mount 97.

The actuator driver 170 of FIG. 1 includes a hydraulic piston 208 (schematically shown in FIG. 1) and an actuator ram 210. The hydraulic piston 208 is housed within the actuator housing 168. This hydraulic piston 208 is motively coupled to the actuator ram 210. The hydraulic piston 208 may thereby move (e.g., translate) the actuator ram 210 longitudinally along the centerline 36.

The actuator ram 210 projects longitudinally along the centerline 36 out from the actuator housing 168, within/out of an internal bore of the tool adaptor 29 and into/within an internal bore of the tool head 28 to a distal end 212 of the actuator ram 210. The actuator ram 210 is configured to longitudinally engage (e.g., contact, abut, press against, etc.) the carrier 24 at the ram distal end 212. With this arrangement, the tool assembly 20 may pull the component 22 longitudinally off of the carrier 24 as the hydraulic piston 208 pushes the actuator ram 210 longitudinally against the carrier 24 and thereby pulls the actuator housing 168 and the attached tool adaptor 29 and tool head 28 longitudinally away from the carrier 24.

Figure 11:
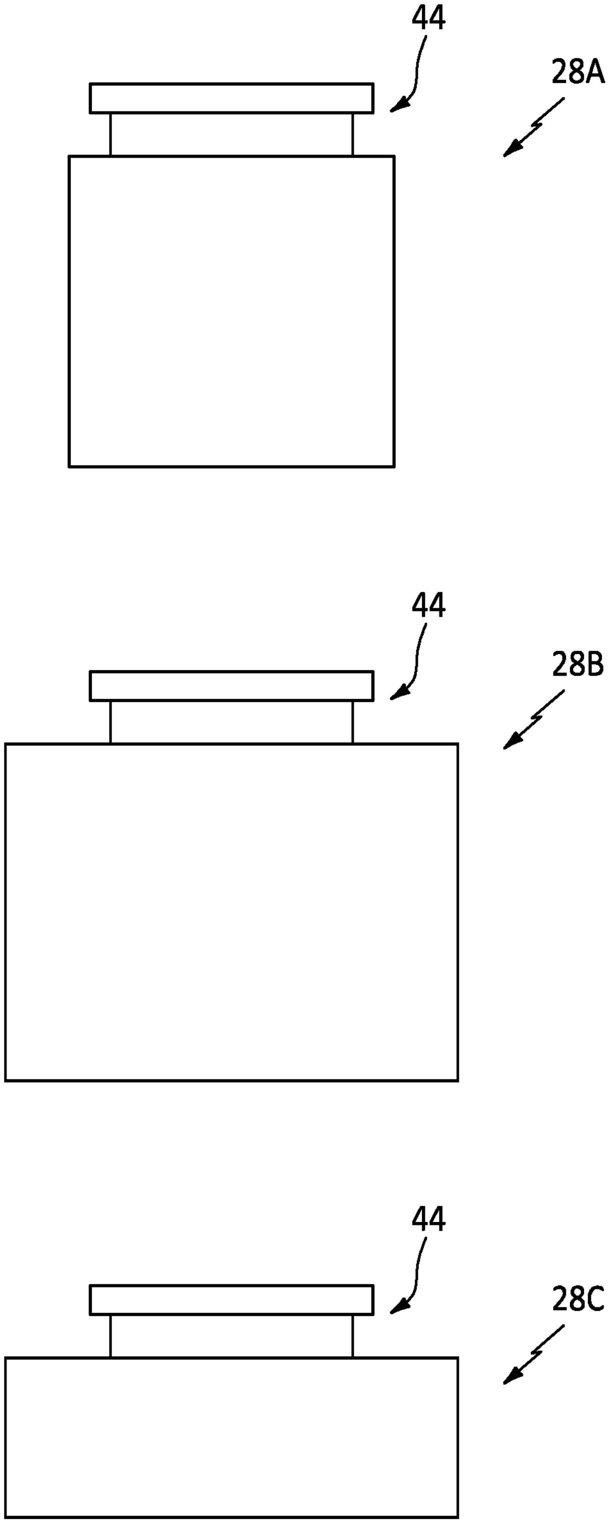
FIG. 11 is a schematic illustration of an array of different heads for the tool assembly.

In some embodiments, referring to FIG. 11, the tool head 28 may be one of a plurality of tool heads 28A-C (generally referred to as "28"). Each of these tool heads 28 is configured to attach to the adaptor coupler 96 (e.g., see FIG. 7B), for example, as described above. However, each of the tool heads 28 may be configured to attach to a different mounted component 22 (see FIG. 1). For example, one of the tool heads 28 may be configured to attach to a bearing or a bearing component (e.g., an inner race) with a first configuration (e.g., size, shape, etc.) and another one of the tool heads 28 may be configured to attached to a bearing or a bearing component (e.g., an inner race) with a second configuration that is different than the first configuration. One of the tool heads 28 may also or alternatively be configured to attach to a seal element with a first configuration (e.g., size, shape, etc.) and another one of the tool heads 28 may be configured to attached to a seal element with a second configuration that is different than the first configuration. Referring to FIG. 1, a single tool adaptor 29 and a single tool actuator 30 may thereby be employed to remove various different types of components 22 by changing out the tool heads 28 using the adaptor coupler 96.

The adaptor coupler 96 and/or the actuator coupler 172 may each be configured as a quick coupler; e.g., a tool free coupler. The term "quick coupler" may describe a coupler which may be attached to and/or removed from a respective mount relatively quickly (e.g., with a low number of process steps) and without use of a tool. Each of the couplers 96, 172 described above, for example, may be attached or removed by performing a few simple process steps; e.g., manipulating the respective latch 106, 180 and rotating the respective coupler 96, 172 and/or mount 44, 97. Each of the couplers 96, 172 may also be attached or removed (e.g., only) using hands of an operator. Providing such quick couplers may reduce tool assembly 20 setup time.

Figure 12:
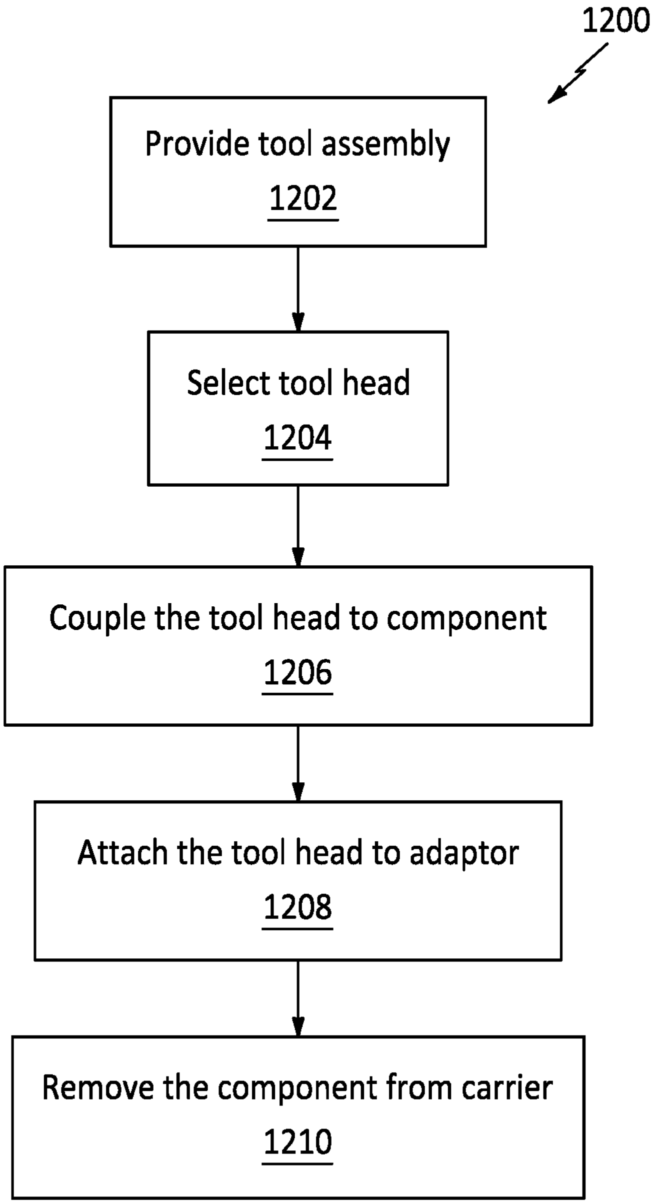
FIG. 12 is a flow diagram of method for removing the component from the carrier.

FIG. 12 is a flow diagram of a method 1200 for removing the component 22 from the carrier 24. This removal method 1200 is described below with reference to the tool assembly 20 of FIG. 1 for ease of description. The removal method 1200 of the present disclosure, however, may alternatively be performed using tool assemblies with other configurations.

In step 1202, the tool assembly 20 is provided.

In step 1204, one of the tool heads 28 is selected that matches a configuration of the component 22 to be removed from the carrier 24.

In step 1206, the selected tool head 28 is coupled to the component 22.

In step 1208, the selected tool head 28 is attached to the tool adaptor 29. This attachment step 1208 may be performed before or after the coupling step 1206.

In step 1210, the component 22 is removed from the carrier 24. The tool actuator 30, for example, is operated to longitudinally push against the carrier 24 and thereby pull the component 22 off of the carrier 24.

The rotating assembly 26 may be included in various types and configurations of gas turbine engines. The rotating assembly 26, for example, may be included in a geared gas turbine engine where a gear train connects one or more shafts to one or more rotors in a fan section, a compressor section and/or any other engine section. Alternatively, the rotating assembly 26 may be included in a direct drive gas turbine engine configured without a gear train. The rotating assembly 26 may be included in a gas turbine engine configured with a single spool, with two spools, or with more than two spools. The gas turbine engine may be configured as a turbofan engine, a turbojet engine, a turboprop engine, a turboshaft engine, a propfan engine, a pusher fan engine or any other type of gas turbine engine for propelling an aircraft. The gas turbine engine may alternative be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A tool assembly for removing a component from a carrier of a gas turbine engine, the component circumscribing and mounted on the carrier, the tool assembly comprising:
- a tool head configured to couple to the component;
- an adaptor extending longitudinally along a centerline between an adaptor first end and an adaptor second end, the adaptor attached to the tool head at the adaptor first end by a first quick coupler; and
- an actuator including a housing and a ram, the housing attached to the adaptor at the adaptor second end by a second quick coupler, the ram extending longitudinally along the centerline within the adaptor and the tool head to a ram distal end, and the ram distal end configured to engage the carrier;
- wherein at least one of
  - the first quick coupler is configured to attach the adaptor to the tool head without use of a tool; or
  - the second quick coupler is configured to attach the housing to the adaptor without use of a tool;
- wherein the tool head comprises a mount;
- wherein the first quick coupler comprises a receptacle configured to receive the mount; and
- wherein the mount is configured to twist about the centerline within the receptacle between an unlocked position and a locked position, and the tool head is secured to the adaptor when in the locked position.

2. The tool assembly of claim 1, wherein at least one of
- the adaptor comprises the first quick coupler; or
- the housing comprises the second quick coupler.

3. The tool assembly of claim 1, wherein
- the first quick coupler is configured to attach the adaptor to the tool head without use of the tool; and
- the first quick coupler is configured for removal of the adaptor from the tool head without use of a tool.

4. A tool assembly for removing a component from a carrier of a gas turbine engine, the component circumscribing and mounted on the carrier, the tool assembly comprising:
- a tool head configured to couple to the component;
- an adaptor extending longitudinally along a centerline between an adaptor first end and an adaptor second end, the adaptor attached to the tool head at the adaptor first end by a first quick coupler; and
- an actuator including a housing and a ram, the housing attached to the adaptor at the adaptor second end by a second quick coupler, the ram extending longitudinally along the centerline within the adaptor and the tool head to a ram distal end, and the ram distal end configured to engage the carrier;
- wherein the first quick coupler comprises a latch, the latch is pivotable between a locked position and an unlocked position, and the latch is configured to engage a notch when in the locked position to lock the adaptor onto the tool head.

5. The tool assembly of claim 1, wherein
- the first quick coupler further comprises a keyed interior rim with a keyed orifice to the receptacle;
- the mount has a keyed exterior rim;
- the keyed exterior rim is configured to pass through the keyed orifice into the receptacle;
- the mount and the receptacle are configured to twist relative to one another between the unlocked position and the locked position; and
- the keyed interior rim captures the keyed exterior rim within the receptacle when in the locked position.

6. The tool assembly of claim 1, wherein
- the second quick coupler is configured to attach the housing to the adaptor without use of the tool; and
- the second quick coupler is configured for removal of the housing from the adaptor without use of a tool.

7. A tool assembly for removing a component from a carrier of a gas turbine engine, the component circumscribing and mounted on the carrier, the tool assembly comprising:
- a tool head configured to couple to the component;
- an adaptor extending longitudinally along a centerline between an adaptor first end and an adaptor second end, the adaptor attached to the tool head at the adaptor first end by a first quick coupler; and
- an actuator including a housing and a ram, the housing attached to the adaptor at the adaptor second end by a second quick coupler, the ram extending longitudinally along the centerline within the adaptor and the tool head to a ram distal end, and the ram distal end configured to engage the carrier;

wherein the second quick coupler comprises a latch, the latch is pivotable between a locked position and an unlocked position, and the latch is configured to engage a notch when in the locked position to lock the housing onto the adaptor;

wherein the adaptor comprises a mount;

wherein the second quick coupler further comprises a receptacle configured to receive the mount; and wherein the mount is configured to twist about the centerline within the receptacle between an unlocked position and a locked position, and the adaptor is secured to the housing when in the locked position.

8. A tool assembly for removing a component from a carrier of a gas turbine engine, the component circumscribing and mounted on the carrier, the tool assembly comprising:

a tool head configured to couple to the component;

an adaptor extending longitudinally along a centerline between an adaptor first end and an adaptor second end, the adaptor attached to the tool head at the adaptor first end by a first quick coupler; and an actuator including a housing and a ram, the housing attached to the adaptor at the adaptor second end by a second quick coupler, the ram extending longitudinally along the centerline within the adaptor and the tool head to a ram distal end, and the ram distal end configured to engage the carrier;

wherein at least one of the first quick coupler is configured to attach the adaptor to the tool head without use of a tool; or the second quick coupler is configured to attach the housing to the adaptor without use of a tool;

wherein the adaptor comprises a mount;

wherein the second quick coupler comprises a receptacle configured to receive the mount; and wherein the mount is configured to twist about the centerline within the receptacle between an unlocked position and a locked position, and the adaptor is secured to the housing when in the locked position.

9. The tool assembly of claim 8, wherein the second quick coupler further comprises a keyed interior rim with a keyed orifice to the receptacle;

the mount has a keyed exterior rim;

the keyed exterior rim is configured to pass through the keyed orifice into the receptacle;

the mount and the receptacle are configured to twist relative to one another between the unlocked position and the locked position; and the keyed interior rim captures the keyed exterior rim within the receptacle when in the locked position.

10. The tool assembly of claim 1, wherein the adaptor comprises the first quick coupler, a tubular sidewall and a mount;

the tubular sidewall extends circumferentially about the centerline, and the tubular sidewall extend longitudinally along the centerline between the first quick coupler and the mount; and the mount is mated with the second quick coupler to attach the housing to the adaptor.

11. The tool assembly of claim 1, wherein the tool head includes a plurality of grips and a sleeve;

the plurality of grips are arrangeable about and configured to engage the component, and a first of the plurality of grips includes a protrusion configured to project radially into an aperture in the component; and the sleeve is slidable over the plurality of grips to retain the plurality of grips in engagement with the component.

12. The tool assembly of claim 1, wherein the actuator comprises a linear actuator.

13. The tool assembly of claim 1, wherein the actuator comprises a hydraulic jack with a piston configured to move the ram longitudinally along the centerline.

14. The tool assembly of claim 4, wherein the tool head comprises a mount;

the first quick coupler further comprises a receptacle configured to receive the mount; and the mount is configured to twist about the centerline within the receptacle between an unlocked position and a locked position, and the tool head is secured to the adaptor when in the locked position.

15. The tool assembly of claim 4, wherein the first quick coupler further comprises a receptacle and a keyed interior rim with a keyed orifice to the receptacle;

the tool head comprises a mount with a keyed exterior rim;

the keyed exterior rim is configured to pass through the keyed orifice into the receptacle;

the mount and the receptacle are configured to twist relative to one another between an unlocked position and a locked position; and the keyed interior rim captures the keyed exterior rim within the receptacle when in the locked position.

16. The tool assembly of claim 7, wherein the second quick coupler further comprises a keyed interior rim with a keyed orifice to the receptacle;

the mount has a keyed exterior rim;

the keyed exterior rim is configured to pass through the keyed orifice into the receptacle;

the mount and the receptacle are configured to twist relative to one another between the unlocked position and the locked position; and the keyed interior rim captures the keyed exterior rim within the receptacle when in the locked position.

* * * * *